United States Patent
George et al.

(10) Patent No.: US 8,880,702 B2
(45) Date of Patent: *Nov. 4, 2014

(54) PROVISION OF OTHER THAN 1:1 RESOURCE MAPPING

(75) Inventors: Manu T. George, Karnataka (IN); Murali K. Surampalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/463,159

(22) Filed: May 3, 2012

(65) Prior Publication Data

US 2013/0297797 A1  Nov. 7, 2013

(51) Int. Cl.
*G06F 15/173* (2006.01)
*H04L 29/08* (2006.01)
*H04L 12/66* (2006.01)

(52) U.S. Cl.
CPC .......... *H04L 29/08144* (2013.01); *H04L 12/66* (2013.01)
USPC ............................... 709/226; 710/36; 711/150

(58) Field of Classification Search
CPC ................... H04L 29/08144; H04L 29/08072; H04L 29/08171; H04L 29/06; H04L 12/66; G06F 15/7867; G06F 17/30; G06F 11/1423
USPC ............................... 709/226; 710/36; 711/150
See application file for complete search history.

(56) References Cited

U.S. PATENT DOCUMENTS

| | | | |
|---|---|---|---|
| 5,765,153 A * | 6/1998 | Benantar et al. ...................... 1/1 |
| 7,483,914 B2 | 1/2009 | Chang et al. |
| 7,594,224 B2 | 9/2009 | Patrick et al. |
| 7,734,653 B2 | 6/2010 | Dykes et al. |
| 7,849,459 B2 * | 12/2010 | Burkhart et al. ............... 717/174 |
| 7,984,437 B2 | 7/2011 | Spotswood et al. |
| 2004/0044909 A1 * | 3/2004 | Mirza et al. ................... 713/201 |
| 2006/0277220 A1 | 12/2006 | Patrick et al. |
| 2011/0082926 A1 * | 4/2011 | Triano et al. .................. 709/224 |

OTHER PUBLICATIONS

Designing Enterprise Applications with the J2EETM Platform, Second Edition, printed May 3, 2012.
Securing Web Applications, printed May 3, 2012.
J2EE Connector Security, printed May 3, 2012.
Using JNDI Registry Service to Locate Resources, printed May 3, 2012.
Office Action, issued by U.S. Patent and Trademark Office in U.S. Appl. No. 13/486,377, filed Aug. 1, 2013.
Office action of co-pending U.S. Appl. No. 13/486,377 mailed Feb. 3, 2014.

* cited by examiner

*Primary Examiner* — Eleni Shiferaw
*Assistant Examiner* — Gregory M Elmore
(74) *Attorney, Agent, or Firm* — Nelson Mullins Riley & Scarborough, LLP (57) ABSTRACT

A method for providing other than a 1:1 resource mapping may include receiving an indication of a selected resource reference element, receiving an indication of at least one resource to be associated with the resource reference element, and generating, via processing circuitry, a registry including a declarative policy defining an association of the selected resource reference element and the at least one resource in which the registry defines an other than 1:1 mapping between resource reference elements and resources.

8 Claims, 6 Drawing Sheets

PROVISION OF OTHER THAN 1:1 RESOURCE MAPPING

BACKGROUND

Example embodiments generally relate to provision of resources to applications and, more particularly, relate to a mechanism by which resource mapping may be provided using a declarative policy for resources such as, for example, J2EE (Java 2 Platform, Enterprise Edition) resources.

SUMMARY

Some example embodiments may provide an other than 1:1 mapping (e.g., an N:N mapping) between resource references in an application and application server resources. Some example embodiments may alternatively or additionally provide the mapping via a declarative policy that considers rules to determine appropriate resources for a resource reference (e.g., based on context information). In some embodiments, the policies may include rules that are defined declaratively by a server administrator. The policies may be applied to different scopes (e.g., server scope, cell scope, node scope) or to different containers. Thus, for example, the same application resource reference element may be mapped to multiple server resources so that an application, without having to otherwise be modified, can connect to multiple databases based on different criteria (e.g., the application may be enabled to connect to a different database for a based on a category or classification of the user utilizing the application). Accordingly, utilization of resources (e.g., usage of memory, threads, processors and/or the like) may be improved.

In this regard, for example, one example embodiment may include a method for providing other than a 1:1 resource mapping. The method may include receiving an indication of a selected resource reference element, receiving an indication of at least one resource to be associated with the resource reference element, and generating, via processing circuitry, a registry including a declarative policy defining an association of the selected resource reference element and the at least one resource in which the registry defines an other than 1:1 mapping between resource reference elements and resources.

In another example embodiment, an apparatus for providing other than a 1:1 resource mapping is provided. The apparatus may include processing circuitry configured for receiving an indication of a selected resource reference element, receiving an indication of at least one resource to be associated with the resource reference element, and generating, via processing circuitry, a registry including a declarative policy defining an association of the selected resource reference element and the at least one resource in which the registry defines an other than 1:1 mapping between resource reference elements and resources.

In another example embodiment, a computer program product for providing other than a 1:1 resource mapping is provided. The computer program product may include a computer-readable storage medium having computer-executable program code instructions stored therein. The computer-executable program code instructions may include program code instructions for receiving an indication of a selected resource reference element, receiving an indication of at least one resource to be associated with the resource reference element, and generating, via processing circuitry, a registry including a declarative policy defining an association of the selected resource reference element and the at least one resource in which the registry defines an other than 1:1 mapping between resource reference elements and resources.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

With electronic devices becoming ubiquitous in our daily lives, various applications and software have been developed, and continue to be developed, in order to give the users of such devices robust capabilities to perform tasks, communicate, entertain themselves, etc., in either fixed or mobile environments. However, many electronic devices may have different operating systems, hardware and software configurations and the like. Thus, many such devices may require different versions of a particular application to be developed in order to permit operation of the particular application at each different type of electronic device. If such different versions were developed to correspond to each different operating system, the cost of developing software and applications would be increased.

Accordingly, virtual machines (VMs) have been developed. A VM is a self-contained operating environment that behaves as if it is a separate computer. The VM may itself be a piece of computer software that isolates the application being used by the user from the host computer or operating system. For example, Java applets run in a Java VM (JVM) that has no access to the host operating system. Because versions of the VM are written for various computer platforms, any application written for the VM can be operated on any of the platforms, instead of having to produce separate versions of the application for each computer and operating system. The application may then be run on a computer using, for example, an interpreter such as Java. Java, which is well known in the industry, is extremely portable, flexible and powerful with respect to allowing applications to, for example, access features of the electronic device on which they are employed. Thus, Java has been widely used by developers to develop portable applications that can be run on a wide variety of electronic devices or computers without modification.

Particularly in environments where resources are scarce or where large amounts of resources are used due to consumer demand, it is often important to conserve, reuse or otherwise allocate resources in an efficient manner whenever possible. In some environments, such as Java EE (Enterprise Edition) servers, applications look up resources and other Java EE components (e.g., like Enterprise JavaBeans (EJBs)) from a Java Naming and Directory Interface (JNDI) registry. The JNDI is a Java application programming interface (API) for a directory service that allows Java software clients to discover and/or look up data and/or objects via a resource name. Other conventional application servers provide different implementations of the same type of lookup service described above (i.e., based on binding resources or components to names).

In some cases, applications may be enabled to define resource references in their deployment descriptors and can map the resource reference at deployment time to a resource in the server's JNDI registry. The resource may then be looked up in the application using the resource reference name mapped to the resource. This may enable a user or deployer of an application to utilize some flexibility in relation to mapping a resource reference to a different resource, and the application may be provided with a handle to the new resource without any code changes.

Figure 1:
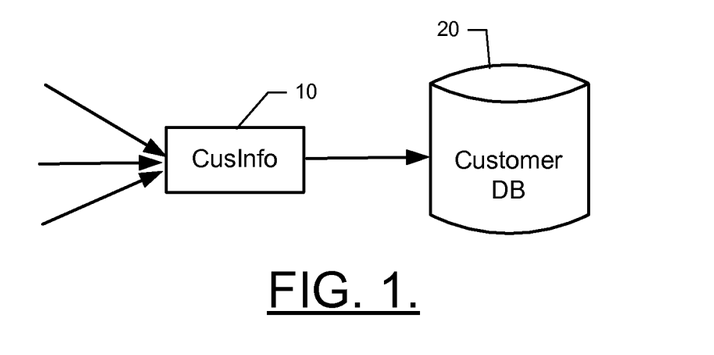
FIG. 1 illustrates an example of a mapping of a resource reference element to a corresponding resource according to an example embodiment.

For an application to connect to a data source to fetch application data, the application may declare a resource reference element (e.g., CusInfo) in a deployment descriptor. When the application is deployed onto an application server, a mapping may take place between the resource reference element and the application server resource as shown in FIG. 1. In this regard, for example, the mapping may define that the resource reference element (e.g., CusInfo 10) is mapped to an actual specific data source (e.g., Customer DB 20). The data source may be a Java Database Connectivity (JDBC) database having a JNDI name represented as jdbc/DB. Thus, for example, the application may lookup the resource using the resource reference name CusInfo 10. This situation may represent a resource mapping allowed to define a 1:1 mapping between resource references and target resources. In situations where applications may need to access different resources based on many different criteria (e.g., where a SAAS based CRM application is built on a J2EE platform and is hosted on a public cloud). To promote the application, free access may be given to some users on the hopes that a subset of those given free access will buy a license to obtain enhanced access to services (e.g., where less restrictions are provided relative to size, power, and storage) that may require access to a higher end database. The switch to a different database may be accomplished via the insertion of custom logic built into the application, and the custom logic may need to be aware of the actual resource names, which may actually negate the advantage of using the approach at all.

Some example embodiments may instead enable N:N mapping (e.g., other than 1:1 mapping) between resource references in an application and application server resources. Some example embodiments may accomplish this by providing the mapping via a declarative policy that considers rules to determine appropriate resources for a resource reference (e.g., based on context information). In some embodiments, the policies may include rules that are defined declaratively by a server administrator. The policies may be applied to different scopes (e.g., server scope, cell scope, node scope) or to different containers (each of which may host various components and may authorize access to the components based on authorization credentials (e.g., security attributes) provided by calling parties or users). Thus, for example, the same application resource reference element may be mapped to multiple server resources so that an application, without having to otherwise be modified, can connect to multiple databases based on different criteria (e.g., the application may be enabled to connect to a different database for a based on a category or classification of the user utilizing the application).

Figure 2:
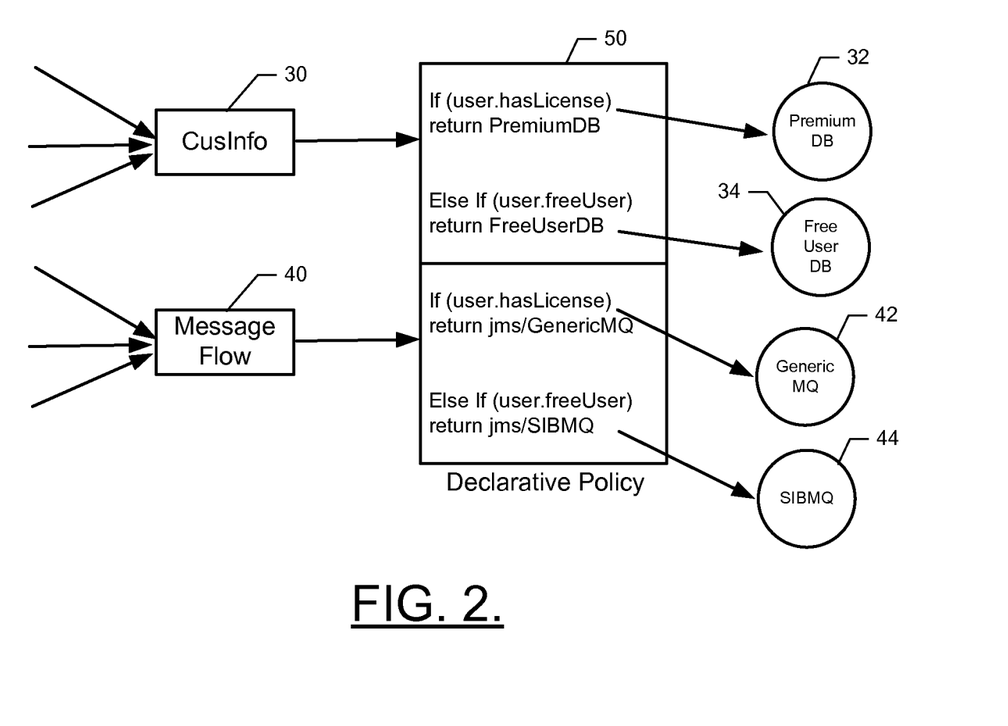
FIG. 2 illustrates an example of an N:N mapping according to an example embodiment.

FIG. 2 illustrates an example of an N:N mapping according to an example embodiment. In this regard, context information available at runtime may be used by an example embodiment of a policy manager in order to determine a selected mapping to implement. For example, at runtime, resolution of a JNDI name may be accomplished to identify a corresponding resource based on information (i.e., context information) gathered from the request or the current thread. The information may be validated by the policy manager based on policy information to identify a particular 1:1 mapping (from among the N:N mappings) to be generated for use at runtime based on the rules defined in the policy. For example, when a user that is initially enabled to access a free version of an application logs onto the application, the application metadata may resolve to a resource that represents a limited capability database machine based on a mapping for context information indicating a free user and corresponding selection of a mapping to direct the user to the limited capability database machine. However, when a premium user (e.g., a user that has purchased a license for premium access) logs onto the application, application metadata may resolve to a resource that represents a more highly capable database machine based on a different mapping for context information indicating a premium user and corresponding selection of a mapping to direct the user to the more highly capable database machine.

In this regard, FIG. 2 illustrates a first application resource reference element (e.g., CusInfo 30) that is conditionally mapped to two possible resources including a first resource 32 (e.g., a premium database (PremiumDB)) and a second resource 34 (e.g., a lower end database (FreeUserDB)). As can be appreciated from FIG. 2, in this example, the conditional mapping defines two different potential mappings for the first application resource reference element based on information determinable from the context of the request or from the thread. In this regard, the policy rules upon which a determination as to the selected mapping is made define that a distinction is to be made between users that either have a license (e.g., premium users) or do not have a license (e.g., free users). A resource reference to corresponding resource mapping is therefore determined at runtime to assign the corresponding resource to the resource reference on the basis of context information. The policy rules used to enable the selectively determinable mapping are provided as a declarative policy 50.

FIG. 2 also illustrates a second application resource reference element (e.g., Message Flow 40) that is conditionally mapped to two possible resources relating to message oriented middleware products (e.g., WebSphere MQ products). In this regard, the two possible resources include a first resource 42 (e.g., jms/GenericMQ) to which the second application resource reference element is mapped for users with a license (e.g., premium users) and a second resource 44 (e.g., jms/SIBMQ) for users without a license (e.g., free users).

It should be appreciated that although FIG. 2 shows resource reference elements conditionally mapped to two corresponding resources, the mappings could include many more resource reference elements and many more corresponding potential resources (perhaps even for each resource reference element). Thus, for example, a plurality of different conditions could be distinguishable to determine a mapping on the basis or various different criteria. Moreover, in some cases, a default condition may be defined and any runtime determined context information that does not fit within one of the other conditions defined in the mappings provided may result in selection of the default condition and its corresponding mapping. It should also be appreciated that example embodiments may be employed in relation to any of a plurality of different server resources including, for example, JDBC resources, MQ resources, OSGi service reference, Mail resources, and/or the like.

Implementation of an example embodiment may include configuration and operation aspects. Moreover, according to some example embodiments, configuration may enable operators to make resource-reference mappings at the application scope and specify JNDI names at the server scope, but further extend upon that capability to configure a policy that defines rules (e.g., conditional rules) for defining mappings of resource-references to corresponding resources. The policy, which may include rules defined declaratively, may include all possible resources that a resource reference may resolve to during a lookup process. In some cases, the policy may include declarative rules for mapping EJB-resources and web-service references, and/or include mappings for JNDI names.

According to some examples, the policy is enabled to be applied to different scopes. Thus, for example, policies may be defined for the server scope, application scope, cell scope, node scope, container scope, and/or the like. As such, when a policy is applied to the application scope, JNDI lookups on threads serving the application may be based on the mappings in the corresponding application scope policy. In cases where there are no mappings in the policy, application level mappings may be used for resource-references and the original JNDI mappings may be used for JNDI lookups. A sample extensible markup language (XML) representation of a policy that maps a resource reference to a resource is provided below:

```
<policy:id name="datasource" application="CRM">
    <condition matches="user.license=true" && user.domain=ibm.com">
        <map resourceref-name="rf1" target="r1"/>
        <map resourceref-name="rf2" target="r2"/>
    </condition>
</policy>
```

To support the above described configuration, different containers may be configured to apply a policy on a given request and derive results that may later drive resource resolution on a corresponding thread. An artifact generated responsive to the result derivation may be persisted in application metadata as a policy configuration file. In some cases, the configuration may be accomplished responsive to creation of a new policy and declaration of rules for resource resolution. The policy may then be mapped to a selected scope (e.g., from among the scopes mentioned above). Thereafter, if creation and configuration of additional policies is desired, the above described creation of policies and declaration of rules for resource resolution may be repeated along with mapping of the policy to a corresponding selected scope for each additional policy desired. In an example embodiment, actions described above in association with creation of policies, declaration of rules and mapping of policies to a selected scope may all be accomplished by an instance of the policy manager described in greater detail below.

When a request is received by a container, the configured policies may be applied and corresponding context information may be determined or established for the thread that is going to serve the request. Prior to starting to process the request, the container may extract required information (e.g., the context information) to enable a policy to run. The information may be gathered from the request, from the server configuration, or from any other information source that is accessible to the container. The container may then execute the policy based on the information gathered from the request. When the policy is executed, a map or context will be created to generate a 1:1 mapping selected from among the N:N mapping options that are provided to define the mapping details between a resource reference name and server resource as per the rules set forth in the policy. The context or map may be pushed on the thread that is chosen to execute the request.

Responsive to an application looking up a resource, if the thread of execution includes a context that is established during policy resolution by the container, then the lookup may first happen in the context or map that is present on that thread. If the thread of execution does not contain a context, then the application may use a default mapping from the application scope in order to resolve the corresponding resource. Accordingly, mapping of resource references to different resources and Java EE components may be enabled. In some cases, resource reference may be used to override credentials and security mechanisms for connecting to the resource. Thus, the approach described herein may be used to provide different credentials or authentication methods based on contextual information.

Operation in accordance with defined policies may include initially receiving a request at a container. The policy configured on the container may then be applied on the request. A map of resource references to resources subject to the policy may then be returned. All JNDI lookups made on the corresponding thread may be first made on the map, followed by the component JNDI context.

In some embodiments, operation according to configured policies may be accomplished via the policy manager described in greater detail below. As such, the policy manager may include a configuration mode and an operation mode. However, in other embodiments, separate entities may perform activities associated with the configuration mode and the operation mode. In such an example, functionality and/or capabilities associated with the policy manager may alternatively be associated with a corresponding specific entity configured to handle either configuration or operation as described herein.

In an example embodiment, the approach described above may be used for mapping resource references dynamically to different resources based on policies that define different mappings for different respective contextual situations (e.g., as indicated by context information). Policies may be configured to enable a container to do resource resolution for a resource reference based on request information. In other words, the policy can be used to select different data sources for a resource reference based on the geography or other identifying characteristics of the request originator. A policy manager as described herein may therefore enable an other than 1:1 mapping (e.g., an N:N mapping) to be defined between resource references and resources so that, for example, multi-tenancy (e.g., supporting delivery of software to multiple clients from a single, shared instance) may be supported without changes to the application. Additionally, the policy manager may enable different levels of data isolation to be configured between tenants or users. The tenants share the application server and access application resources through separate sessions or thread, but the mapping or resource references to resources is dynamically configurable using the policy manager.

Figure 3:
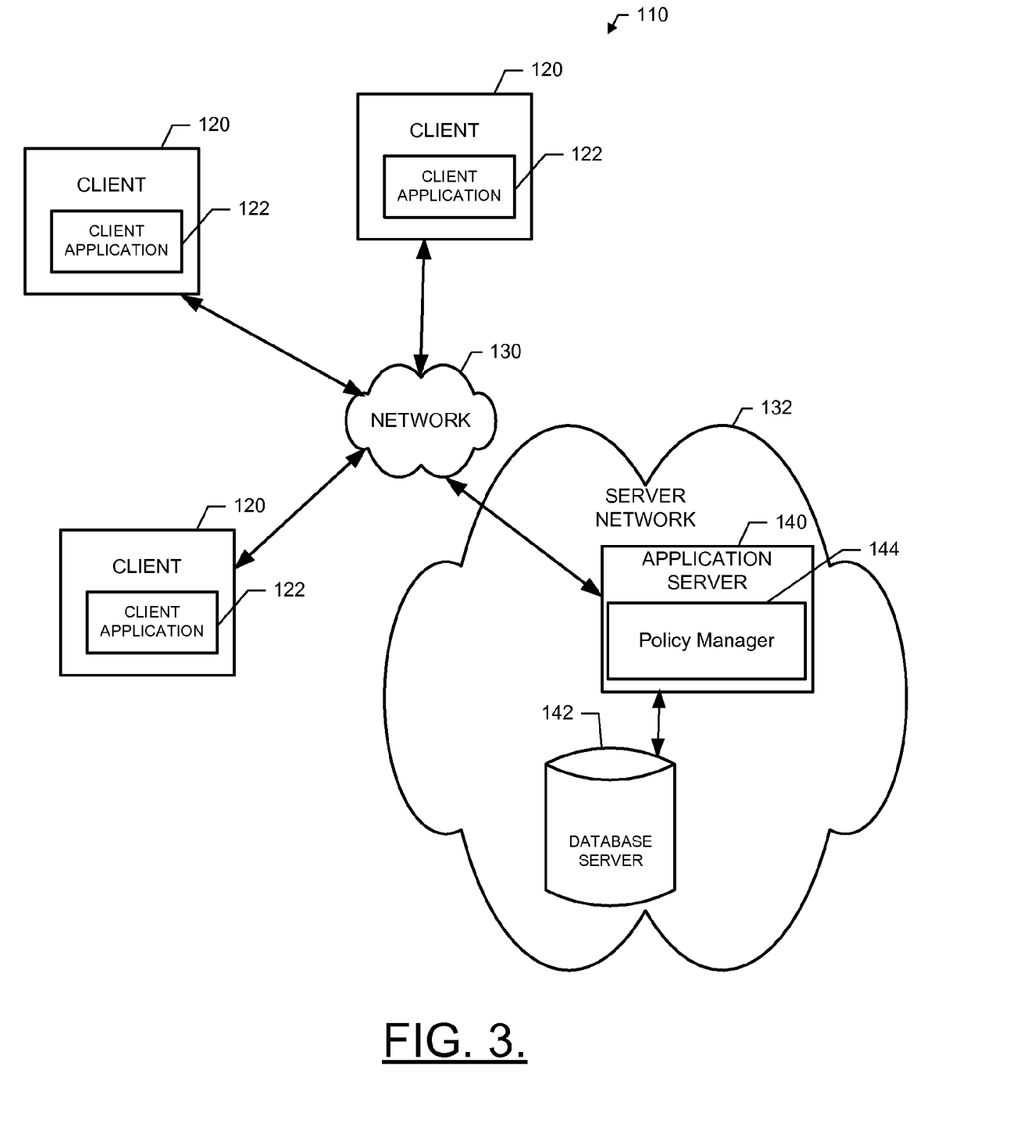
FIG. 3 illustrates a functional block diagram of a system for providing other than a 1:1 resource mapping according to an example embodiment.

FIG. 3 illustrates an example system in which an embodiment of the present invention may be employed. As shown in FIG. 3, a system 110 according to an example embodiment may include one or more client devices (e.g., clients 120). Notably, although FIG. 3 illustrates three clients 120, it should be appreciated that many more clients 120 may be included in some embodiments and thus, the three clients 120 of FIG. 3 are simply used to illustrate a multiplicity of clients 120 and the number of clients 120 is in no way limiting to other example embodiments. In this regard, example embodiments are scalable to inclusion of any number of clients 120 being tied into the system 110. Moreover, it should be appreciated that FIG. 3 illustrates one example embodiment in which shared resources may be accessed within a community of networked devices (e.g., clients 120). However, it should be appreciated that the architecture of various example embodiments may vary. Thus, the example of FIG. 3 is merely provided for ease of explanation of one example embodiment and should not be considered to be limiting with respect to the architecture of the system 110.

The clients 120 may, in some cases, each be computing devices associated with different individuals, locations or entities within an organization. For example, among the clients 120, one client may be associated with a first facility or location of a first organization. Meanwhile, a second client may be associated with a second facility or location of the first organization. However, in some embodiments, each of the clients 120 may be associated with individuals, locations or entities associated with different organizations. As such, for example, some of the clients 120 may be associated with the first organization, while other ones of the clients 120 are associated with a second organization. Thus, for example, the clients 120 may be remotely located from each other, collocated, or combinations thereof.

Each one of the clients 120 may include or otherwise be embodied as a computing device (e.g., a computer, a network access terminal, a personal digital assistant (PDA), cellular phone, smart phone, or the like) capable of communication with a network 130. As such, for example, each one of the clients 120 may include (or otherwise have access to) memory for storing instructions or applications for the performance of various functions and a corresponding processor for executing stored instructions or applications and a corresponding processor or processing circuitry. Each one of the clients 120 may also include software and/or corresponding hardware for enabling the performance of the respective functions of the clients as described below. In an example embodiment, one or more of the clients 120 may include a client application 122 including software for enabling a respective one of the clients 20 to communicate with the network 130 for requesting and/or receiving information and/or services via the network 130. The information or services receivable at the client applications 122 may include deliverable components (e.g., downloadable software to configure the clients 120, or information for consumption or utilization at the clients 120).

The network 130 may be a data network, such as a local area network (LAN), a metropolitan area network (MAN), a wide area network (WAN) (e.g., the Internet), and/or the like, which may couple the clients 120 to devices such as processing elements (e.g., personal computers, server computers or the like) and/or databases. Communication between the network 130, the clients 120 and the devices or databases (e.g., servers) to which the clients 120 are coupled may be accomplished by either wireline or wireless communication mechanisms and corresponding communication protocols. As such, for example, the network 130 may form a cloud computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of a service. The cloud model may include at least five characteristics, at least three service models and at least four deployment models.

Some of the characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In an example embodiment, devices to which the clients 120 may be coupled via the network 130 may include a server network 140 including one or more application servers (e.g., application server 140), and/or a database server 142, which together may form respective elements of a server network 132. Although the application server 140 and the database server 142 are each referred to as "servers," this does not necessarily imply that they are embodied on separate servers or devices. As such, for example, a single server or device may include both entities and the database server 142 could merely be represented by a database or group of databases physically located on the same server or device as the application server 140. The application server 140 and the database server 142 may each include hardware and/or software for configuring the application server 140 and the database server 142, respectively, to perform various functions. As such, for example, the application server 140 may include processing logic and memory enabling the application server 140 to access and/or execute stored computer readable instructions for performing various functions.

In an example embodiment, one function that may be provided by the application server 140 may be the provision of a policy manager 144 that may provide mapping between resources requested by one or more of the clients 120 where the resources are provided by or at an application hosted at one of the servers of the server network 132 as described herein. As an example, the application server 140 may be configured to provide clients 120 with access to the tools for policy configuration and/or operation as described above by executing the tools from the cloud.

In an example embodiment, the application server 140 may include or have access to memory (e.g., internal memory or the database server 142) for storing instructions or applications for the performance of various functions and a corresponding processor for executing stored instructions or applications. For example, the memory may store an instance of the policy manager 144 configured to operate in accordance with an example embodiment of the present invention. In this regard, for example, the policy manager 144 may include software for enabling the application server 140 to communicate with the network 130 and/or the clients 120 for the provision and/or receipt of information associated with performing activities as described herein.

Figure 4:
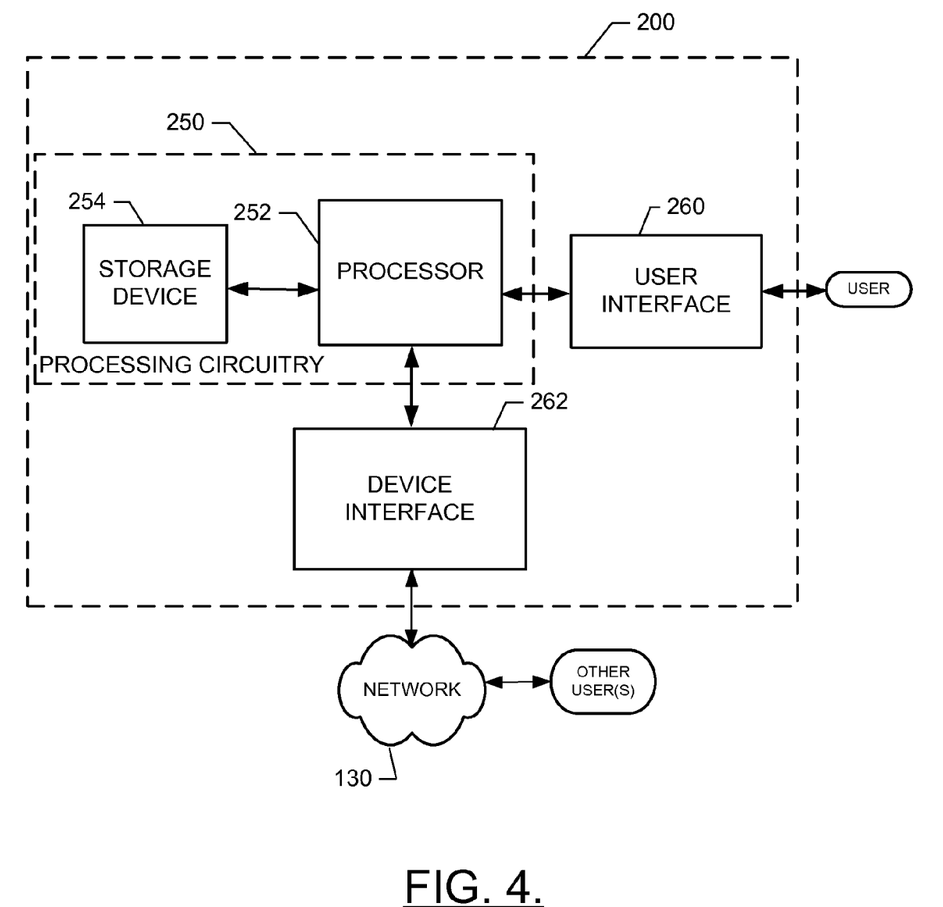
FIG. 4 illustrates a functional block diagram of an apparatus for providing other than a 1:1 resource mapping according to an example embodiment.

Referring now to FIG. 4, an apparatus 200 for provision of tools associated with policy management associated with configuration and operation as described herein is provided. The apparatus 200 may be a cloud computing node, in some embodiments. However, since not all embodiments are necessarily practiced in a cloud computing environment, it should be appreciated that the apparatus 200 is not necessarily a cloud computing node in all example embodiments. The apparatus 200 may be an embodiment of the policy manager 144 or a device hosting the policy manager 144. In some embodiments, the apparatus 200 may be a personal computer system, server computer system, thin client, thick client, handheld or laptop device, multiprocessor system, microprocessor-based system, set top box, programmable consumer electronic device, network PC, minicomputer system, mainframe computer system, distributed cloud computing environment that includes and of the above systems or devices, and/or the like (e.g., one of the clients 120 or a server of the server network 132). The apparatus 200 may function, according to its configuration, as any of a number of different entities. As such, configuration of the apparatus 200 as described herein may transform the apparatus 200 into the policy manager 144. In some cases, configuration of the apparatus 200 may be accomplished via executable instructions such as program modules executed by a computer system. The program modules may include routines, programs, objects, components, logic, data structures, and so on that perform particular tasks or implement particular abstract data types.

In an example embodiment, the apparatus 200 may include or otherwise be in communication with processing circuitry 250 that is configured to perform data processing, application execution and other processing and management services according to an example embodiment of the present invention. In one embodiment, the processing circuitry 250 may include a storage device 254 and a processor 252 (which may itself include one or more processors) that may be in communication with or otherwise control a user interface 260 and a device interface 262. As such, the processing circuitry 250 may be embodied as a circuit chip (e.g., an integrated circuit chip) configured (e.g., with hardware, software or a combination of hardware and software) to perform operations described herein. However, in some embodiments, the processing circuitry 250 may be embodied as a portion of a server, computer, laptop, workstation or even one of various mobile computing devices. In situations where the processing circuitry 250 is embodied as a server or at a remotely located computing device, the user interface 260 may be disposed at another device (e.g., at a computer terminal or network access terminal) that may be in communication with the processing circuitry 250 via the device interface 262 and/or a network (e.g., network 130).

Internal communication among components of the apparatus 200 may be accomplished via a communication bus. Such a communication bus may represent one or more of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The user interface 260 may be in communication with the processing circuitry 250 to receive an indication of a user input at the user interface 260 and/or to provide an audible, visual, mechanical or other output to the user. As such, the user interface 260 may include, for example, a keyboard, a mouse, a joystick, a display, a touch screen, a microphone, a pointing device, a speaker, or other input/output mechanisms. In embodiments where the apparatus is embodied at a server or other network entity, the user interface 260 may be limited or even eliminated in some cases. Alternatively, as indicated above, the user interface 260 may be remotely located.

The device interface 262 may include one or more interface mechanisms for enabling communication with other devices and/or networks. In some cases, the device interface 262 may be any means such as a device or circuitry embodied in either hardware, software, or a combination of hardware and software that is configured to receive and/or transmit data from/to a network and/or any other device or module in communication with the processing circuitry 250. In this regard, the device interface 262 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 262 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 254 may include one or more non-transitory storage or memory devices such as, for example, volatile and/or non-volatile memory that may be either fixed or removable. As such, the storage device 254 may include random access memory (RAM) and/or cache memory. In some embodiments, the storage device 254 may be a magnetic disk drive or an optical disk drive (e.g., CD ROM, DVD ROM and/or the like). The storage device 254 may be configured to store information, data, applications, program modules, instructions or the like for enabling the apparatus to carry out various functions in accordance with example embodiments of the present invention. For example, the storage device 254 could be configured to buffer input data for processing by the processor 252. Additionally or alternatively, the storage device 254 could be configured to store instructions for execution by the processor 252. As yet another alternative, the storage device 254 may include one of a plurality of databases that may store a variety of files, contents or data sets. Among the contents of the storage device 254, applications may be stored for execution by the processor 252 in order to carry out the functionality associated with each respective application.

The processor 252 may be embodied in a number of different ways. For example, the processor 252 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 252 may be configured to execute instructions stored in the storage device 254 or otherwise accessible to the processor 252. As such, whether configured by hardware or software methods, or by a combination thereof, the processor 252 may represent an entity (e.g., physically embodied in circuitry) capable of performing operations according to embodiments of the present invention while configured accordingly. Thus, for example, when the processor 252 is embodied as an ASIC, FPGA or the like, the processor 252 may be specifically configured hardware for conducting the operations described herein. Alternatively, as another example, when the processor 252 is embodied as an executor of software instructions, the instructions may specifically configure the processor 252 to perform the operations described herein.

In an example embodiment, the processor 252 (or the processing circuitry 250) may be embodied as, include or otherwise control the policy manager 144, which may be any means such as a device or circuitry operating in accordance with software or otherwise embodied in hardware or a combination of hardware and software (e.g., processor 252 operating under software control, the processor 252 embodied as an ASIC or FPGA specifically configured to perform the operations described herein, or a combination thereof) thereby configuring the device or circuitry to perform the corresponding functions of the policy manager 144, as described herein.

In some embodiments, the apparatus 200 may operate based on a set of functional abstraction layers including, for example, a hardware and software layer, a virtualization layer, a management layer and/or a workload layer. In an example embodiment, the hardware and software layer may be provided via a plurality of hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The virtualization layer may provide an abstraction layer from which the following examples of virtual entities may be provided: virtual servers; virtual storage; virtual networks, including virtual private networks; virtual applications and operating systems; and virtual clients. In one example, the management layer may provide any of a number of functions including, for example, resource provisioning metering and pricing, billing or invoicing, security user portal provides access, service level management, Service Level Agreement (SLA) planning and fulfillment, and/or the like. The workloads layer may provide examples of functionality for which the cloud computing environment may be utilized. Examples of workloads and functions which may be provided from this layer include provision of a tool for discovery and realization of business measurement concepts using industry models.

As such, in some embodiments, the policy manager 144 may be configured to receive a request at a container, apply an applicable policy based on context information associated with the request, and generate a map of resource references to resources subject to the policy such that resource related lookups may be made on the corresponding thread using the map. The policy manager 144 may be further configured to apply declarative policy rules for resource resolution where the policy rules are mapped to a selected scope.

From a technical perspective, the apparatus 200 described above may be configured accordingly to be used to support some or all of the operations described herein in relation to the policy manager 144. As such, the platform described in FIG. 4 may be used to facilitate the implementation of several computer program and/or network communication based interactions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
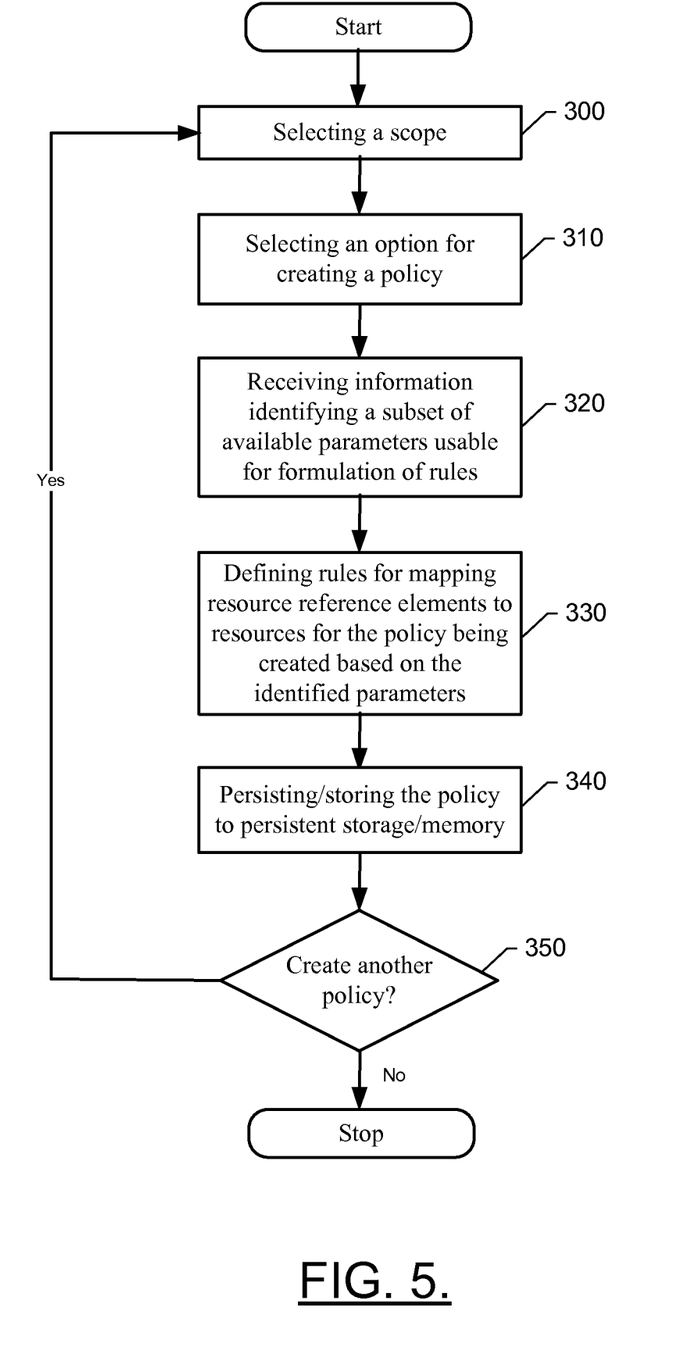
FIG. 5 is a block diagram showing operations associated with generating policy rules according to an example embodiment.

A method according to one embodiment of the invention will now be described in reference to FIG. 5. The method of FIG. 5 may be executed by the policy manager or another entity capable of establishing policies. The method may include selecting a scope (e.g., server, node, etc.) at operation 300 and selecting an option for creating a policy at operation 310. The method may further include receiving information identifying a subset of available parameters usable (or needed) for formulation of rules at operation 320 and defining rules for mapping resource reference elements to resources for the policy being created based on the identified parameters at operation 330. The method may further include persisting/storing the policy to persistent storage/memory at operation 340. In an example embodiment, a determination may then be made as to whether to create additional policies at operation 350. If additional policies are to be created, operation may return to operation 300. However, if no additional policies are to be created, then the method may stop.

Figure 6:
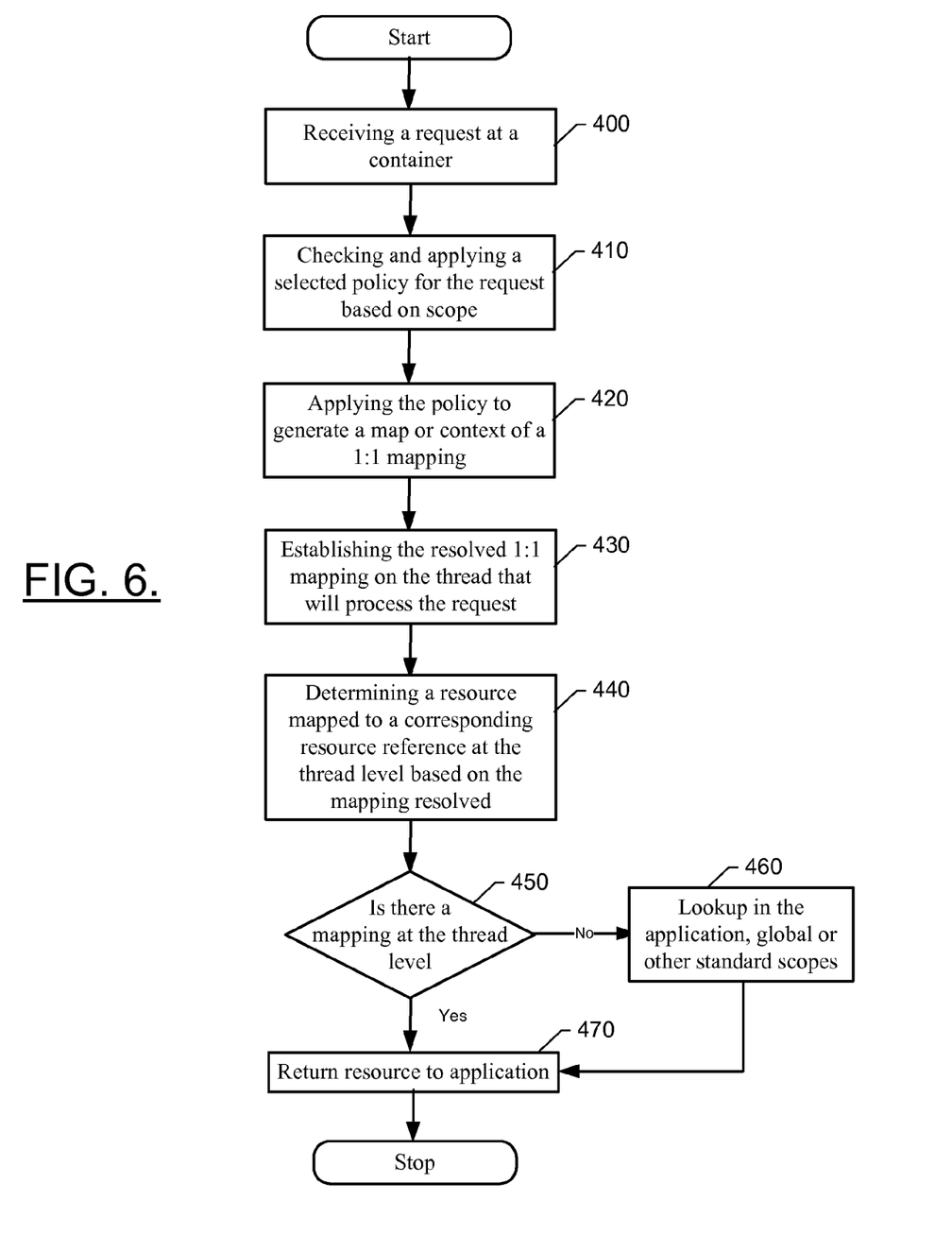
FIG. 6 is a block diagram showing operations associated with executing generated policy rules according to an example embodiment.

Another method according to an embodiment of the invention will now be described in reference to FIG. 6. The method of FIG. 6 may be executed by the policy manager or another entity capable of executing established policies. The method may include receiving a request at a container at operation 400 and checking and applying a selected policy for the request based on scope at operation 410. The method may further include applying the policy to generate a map or context of a 1:1 mapping at operation 420 and establishing the resolved 1:1 mapping on the thread that will process the request at operation 430. The method may further include determining a resource mapped to a corresponding resource reference at the thread level based on the mapping resolved at operation 440. In an example embodiment, a determination may then be made as to whether there is a mapping at the thread level at operation 450. If there is not a mapping, the lookup operation may be conducted in the application, global or other standard scopes at operation 460. Otherwise, or after the lookup, the resource may be returned to the application at operation 470.

In some embodiments, the policy manager may be configured to perform both policy establishment and execution. As such, in some embodiments, an example method (shown in FIG. 7) may include receiving an indication of a selected resource reference element at operation 500, receiving an indication of at least one resource to be associated with the resource reference element at operation 510, and generating, via processing circuitry, a registry including a declarative policy defining an association of the selected resource reference element and the at least one resource at operation 520. The registry may define an other than 1:1 mapping between resource reference elements and resources.

In some embodiments, certain ones of the operations above may be modified or further amplified as described below. Moreover, in some embodiments additional optional operations may also be included (some examples of which are shown in dashed lines in FIG. 7). It should be appreciated that each of the modifications, optional additions or amplifications below may be included with the operations above either alone or in combination with any others among the features described herein. Thus, although operations 520 and 530 are shown in sequence it should be appreciated that either or both of the operations could be performed in various example embodiments. Moreover, although operations 550, 560, 570 and 580 are shown in a separate sequence, it should be appreciated that any or all of operations 550, 560, 570 and 580 could be performed alternatively or in addition to either or both of operations 520 and 530.

Figure 7:
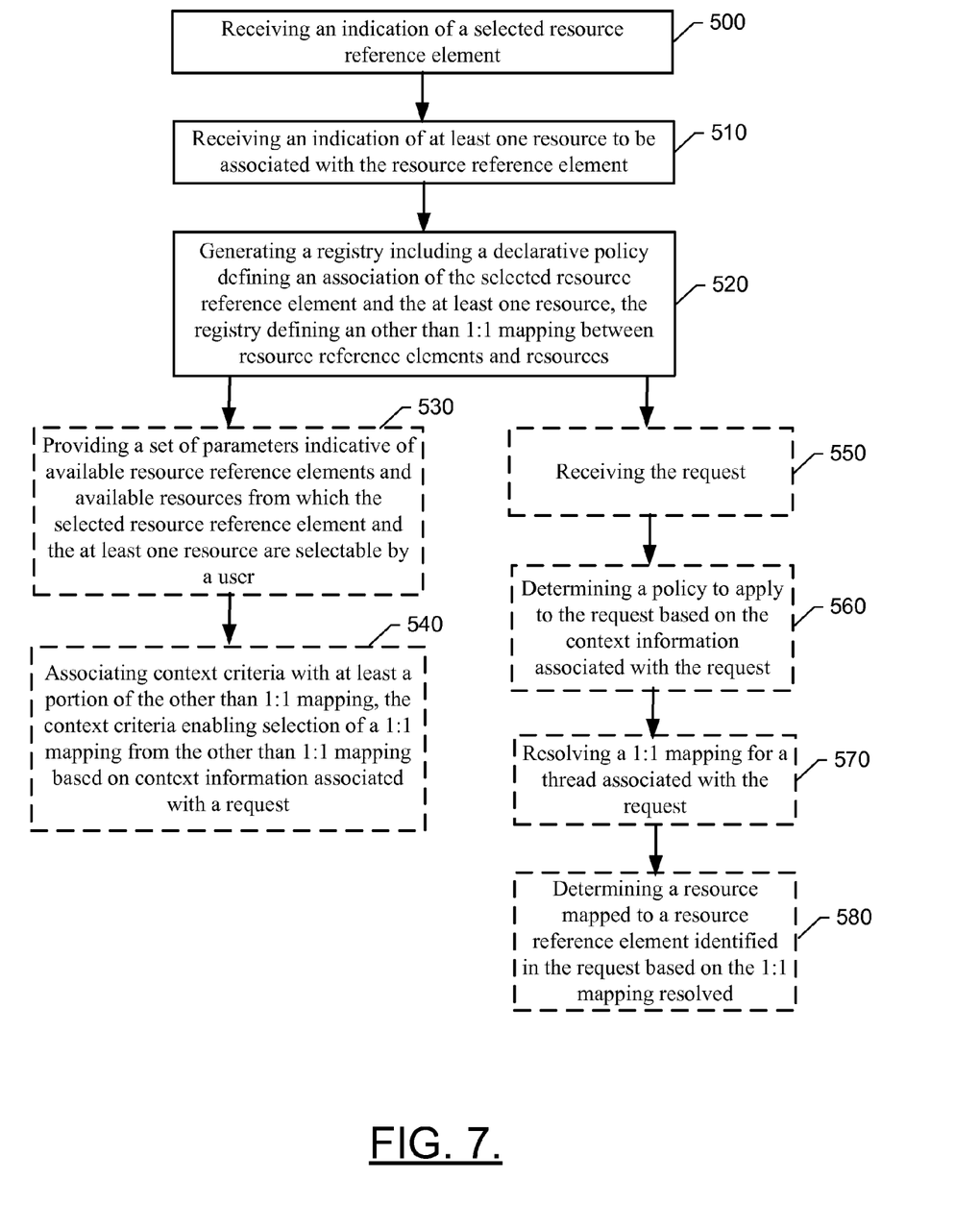
FIG. 7 illustrates a block diagram showing operations associated with a method for providing other than a 1:1 resource mapping according to an example embodiment.

In this regard, in some embodiments the method may further include providing a set of parameters indicative of available resource reference elements and available resources from which the selected resource reference element and the at least one resource are selectable by a user at operation 530. In some embodiments, the method may further include associating context criteria with at least a portion of the other than 1:1 mapping, the context criteria enabling selection of a 1:1 mapping from the other than 1:1 mapping based on context information associated with a request at operation 540. In an example embodiment, associating context criteria with the at least a portion of the other than 1:1 mapping may include defining a different security mapping for resources based on the context information by associating different security related context criteria with corresponding different mappings. Alternatively or additionally, associating context criteria with the at least a portion of the other than 1:1 mapping comprises defining different levels of data isolation in multitenant applications based on corresponding different declarative policies. In an example embodiment, the method may further include one or more of receiving the request at operation 550, determining a policy to apply to the request based on the context information associated with the request at operation 560, resolving a 1:1 mapping for a thread associated with the request at operation 570, or determining a resource mapped to a resource reference element identified in the request based on the 1:1 mapping resolved at operation 580. Receipt of the request and application of the policy may be performed at a container level. In some embodiments, receiving the indication of the at least one resource may include receiving an indication of a first resource to be conditionally associated with the selected resource reference element responsive to a first condition matching context criteria associated with the first resource in the other than 1:1 mapping and receiving an indication of a second resource to be conditionally associated with the selected resource reference element responsive to a second condition matching context criteria associated with the second resource in the other than 1:1 mapping. In some cases, generating the registry may include generating a plurality of declarative policies mapped to respective different scopes.

In an example embodiment, an apparatus for performing the method of FIG. 7 above may comprise a processor (e.g., the processor 252) configured to perform some or each of the operations (500-580) described above. The processor may, for example, be configured to perform the operations (500-580) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
    receiving an indication of a selected resource reference element associated with a database;
    receiving an indication of at least one resource to be associated with the selected resource reference element specified by the indication of the selected resource reference element;
    generating, via processing circuitry, a registry including a declarative policy defining an association of the selected resource reference element and the at least one resource specified by the indication of the at least one resource, the registry defining an other than one-to-one (1:1) mapping between resource reference elements and resources, and the declarative policy including rules for determining which one of the resources mapped to a given one of the resource reference elements in the other than 1:1 mapping to map to the given one of the resource reference elements, based on contextual information associated with the given one of the resource reference element;

associating context criteria with at least a portion of the other than 1:1 mapping, the context criteria enabling selection of a 1:1 mapping from the other than 1:1 mapping based on context information associated with a request that has been received;

determining a policy to apply to the request based on the context information associated with the request based at least in part on the rules defined in the declarative policy; and resolving a 1:1 mapping for a thread associated with the request based on the policy.

2. The method of claim 1, further comprising providing a set of parameters indicative of available resource reference elements and available resources from which the selected resource reference element and the at least one resource are selectable by a user.

3. The method of claim 1, wherein receiving the indication of at least one resource comprises:

receiving an indication of a first resource to be conditionally associated with the selected resource reference element responsive to a first condition matching context criteria associated with the first resource specified by the indication of the first resource in the other than 1:1 mapping; and receiving an indication of a second resource to be conditionally associated with the selected resource reference element responsive to a second condition matching context criteria associated with the second resource specified by the indication of the second resource in the other than 1:1 mapping.

4. The method of claim 1, wherein associating context criteria with the at least a portion of the other than 1:1 mapping comprises defining a different security mapping for resources based on the context information by associating different security related context criteria with corresponding different mappings.

5. The method of claim 1, wherein associating context criteria with the at least a portion of the other than 1:1 mapping comprises defining different levels of data isolation in multi-tenant applications based on corresponding different declarative policies.

6. The method of claim 1, further comprising determining the resource mapped to the given one of the resource reference element identified in the request based on the 1:1 mapping resolved.

7. The method of claim 1, wherein receipt of the request and application of the policy are performed at a container level.

8. The method of claim 1, wherein generating the registry comprises generating a plurality of declarative policies mapped to respective different scopes.

* * * * *